A. J. FELSMAN.
LAND MARKER.
APPLICATION FILED MAY 18, 1914.
1,111,221. Patented Sept. 22, 1914.
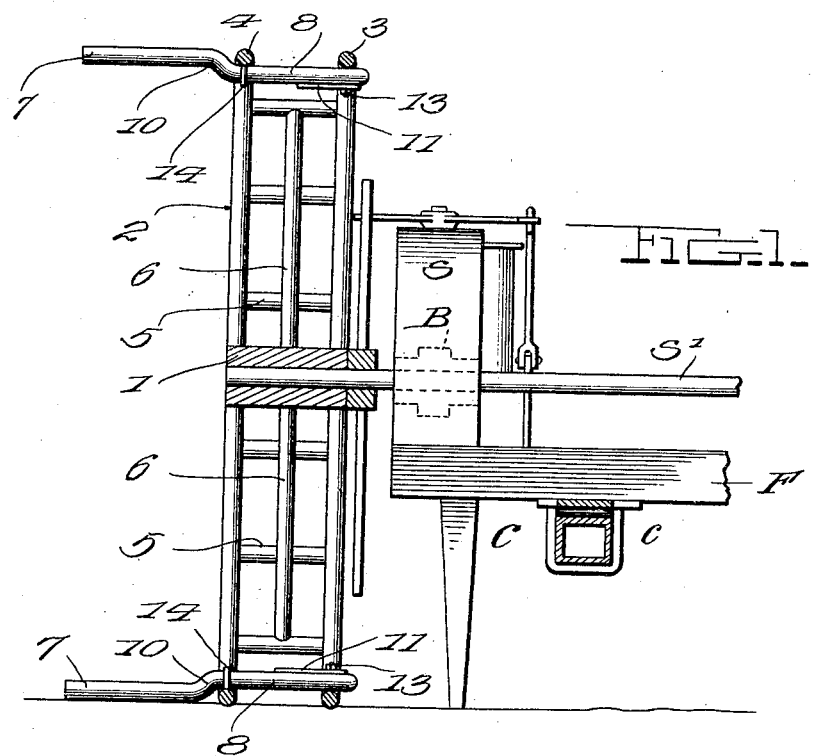
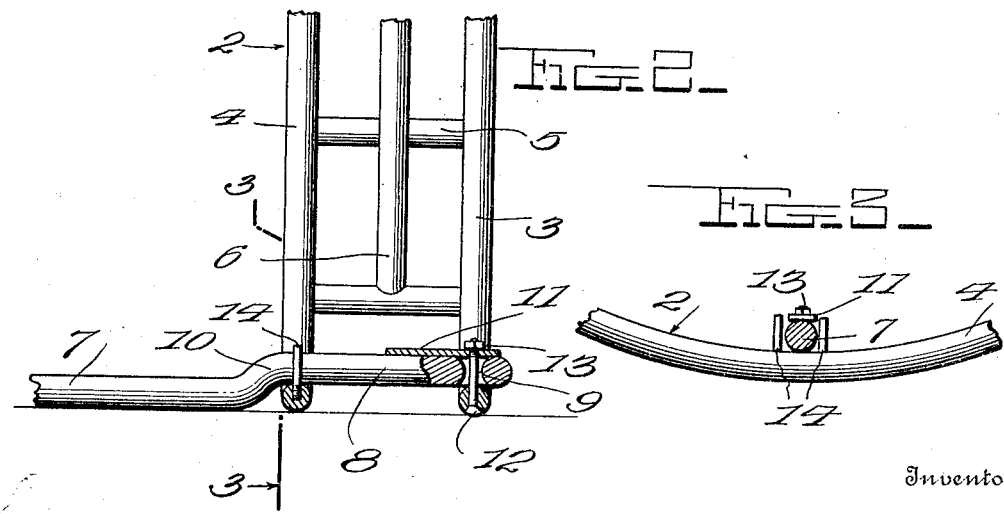
Witnesses
Inventor
A. J. Felsman.
By H. B. Willson & Co.
Attorneys

UNITED STATES PATENT OFFICE.

ALBERT J. FELSMAN, OF MACOMB, ILLINOIS.

LAND-MARKER.

1,111,221.

Specification of Letters Patent. Patented Sept. 22, 1914.

Application filed May 18, 1914. Serial No. 839,340.

*To all whom it may concern:*

Be it known that I, ALBERT J. FELSMAN, a citizen of the United States, residing at Macomb, in the county of McDonough and State of Illinois, have invented certain new and useful Improvements in Land-Markers; and I do declare the following to be a full, clear, and exact description of the invention, such as will enable others skilled in the art to which it appertains to make and use the same.

My invention relates to improvements in land markers and more particularly to those which are designed for use in connection with corn planters.

The primary object of the invention is to provide a marking device of the herein described character, having a number of marking arms which are allowed to yield in case of contact with stones or sun baked clods of earth.

A secondary object of the invention is to construct the device in the most simple manner consistent with its proper operation.

With these and minor objects in view the invention resides in certain novel features of construction and combination herein described and claimed and shown in the drawings wherein:

Figure 1 is a vertical transverse section through a portion of a corn planter showing the application of my invention thereto: Fig. 2 is a view simalar to Fig. 1 but showing, on an enlarged scale, a manner of attaching the marking arms to a wheel to be described; and, Fig. 3 is a vertical section taken upon the line 3—3 of Fig. 2.

In the accompanying drawings, I have shown a portion of a corn planter C, the construction of which may be seen by reference to my United States application Serial Number 813,749 filed Jan. 22, 1914, the construction of the planter forming no part of the present invention although it closely coacts therewith.

The forward portion of the planter C is provided with a hopper and seed shoe supporting frame F, the latter having upright standards S at its opposite ends, in which a pair of bearings B are mounted. Since the structure is identical on both sides of the machine, I have illustrated but one side thereof.

Revolubly mounted with the bearing B and projecting transversely of the hopper frame F is a shaft S' to the outer ends of which hubs 1 of marking wheels 2 are rigidly secured. The tires of said wheels comprising spaced inner and outer rings 3 and 4 respectively which are connected, at intervals, by transverse rods or bars 5 to certain of which spokes 6 are rigidly secured.

A pair of marking arms 7 are yieldingly secured to the tire of each wheel at diametrically opposite points, said arms having inner portions 8 which extend transversely of the tire, formed in the above mentioned manner, the inner ends of said portions 8 being provided with radially located openings 9 which are enlarged on their opposite ends for a purpose to appear. The outer portions of the arms 7 are offset as indicated at 10 and are adapted to be held in yielding contact with the outer ring 4 and with the soil, by means of flat leaf springs 11 which contact with the inner sides of the portions 8 and are provided with openings, located in their inner ends, which aline with the openings 9, fastening bolts 12 passing through the inner rings 3 and through the alined openings in the portions 8 and the springs 11 and receiving nuts 13.

As most clearly seen in Figs. 2 and 3, the arms 7 are guided in their movement, by inwardly extending pins 14 which are positioned one on each side of each arm. By this construction, it will be readily seen that the arms 7 are allowed to yield inwardly and that the pins 14 prevent dislocation thereof.

From the foregoing description, taken in connection with the accompanying drawings it will be seen that I have produced an extremely simple marking device and one which will be highly efficient in operation and which may be inexpensively constructed.

Having thus described my invention, what I claim is:

1. The combination with a rotatably mounted wheel, of a marking arm having a portion contacting with the inner surface of its tire and lying transversely thereof, said portion having a radially located opening, a flat spring in contact with the inner side of said portion of the arm and having an opening registering with the opening therein, a fastening element passing through said alined openings and into one edge portion of the tire, and a radial guide on the opposite edge portion of said tire and adapted to guide said arm.

2. The combination with a rotatably mounted wheel, of a marking arm having a portion contacting with the inner surface of its tire and lying transversely thereof, said portion having a radially located opening, a flat spring in contact with the inner side of said portion of the arm and having an opening registering with the opening therein, a fastening element passing through said alined openings and into one edge portion of the tire, and a pair of inwardly extending guide pins on the opposite edge portion of the tire and disposed on opposite sides of the arm.

3. The combination with a rotatably mounted wheel, of a marking arm having a portion contacting with the inner surface of its tire and lying transversely thereof, said portion having a radially located opening, a flat spring in contact with the inner side of said portion of the arm and having an opening registering with the opening therein, a fastening bolt passing through one edge portion of the tire and through the alined openings in the marking arm and the spring, a nut on said bolt and in contact with said spring and a radial guide on the opposite edge portion of the tire and adapted to guide said arm.

In testimony whereof I have hereunto set my hand in presence of two subscribing witnesses.

ALBERT J. FELSMAN.

Witnesses:
FRANK LEFTRIDGE.
CHARLES W. FLACK.

---

Copies of this patent may be obtained for five cents each, by addressing the "Commissioner of Patents, Washington, D. C."